United States Patent
Nomura

[11] Patent Number: 5,609,435
[45] Date of Patent: Mar. 11, 1997

[54] CONNECTORS FOR FRAME BARS WITH T-SHAPED GROOVES

[75] Inventor: Ryoichi Nomura, Toyama, Japan

[73] Assignee: NIC Autotec, Inc., Japan

[21] Appl. No.: 526,118

[22] Filed: Sep. 7, 1995

[30] Foreign Application Priority Data

Oct. 31, 1994 [JP] Japan .................... 6-290657

[51] Int. Cl.$^6$ .................................................. B25G 3/36
[52] U.S. Cl. ................. 403/387; 403/294; 403/397; 403/405.1; 52/586.2; 52/730.1
[58] Field of Search .................... 403/294, 292, 403/384, 387, 396, 397, 401, 405.1; 52/586.1, 586.2, 730.1, 731.1

[56] References Cited

U.S. PATENT DOCUMENTS

| | | | |
|---|---|---|---|
| 3,348,459 | 10/1967 | Harvey | 52/586.2 X |
| 3,640,039 | 2/1972 | McKee et al. | 52/586.2 X |
| 4,021,890 | 5/1977 | Kurosaki | 403/405.1 X |
| 5,014,478 | 5/1991 | Spring | 52/586.2 X |
| 5,054,256 | 10/1991 | Glover et al. | 52/586.2 X |
| 5,058,333 | 10/1991 | Schwartz | 52/586.2 |
| 5,062,250 | 11/1991 | Buzzella | 52/586.2 |
| 5,398,468 | 3/1995 | Erickson | 52/586.2 X |

FOREIGN PATENT DOCUMENTS 354149  7/1990  European Pat. Off. .............. 403/294

Primary Examiner—Kenneth J. Dorner
Assistant Examiner—Bruce A. Lev
Attorney, Agent, or Firm—Majestic, Parsons, Siebert & Hsue

[57] ABSTRACT

A connector or connecting together elongated frame bars having T-shaped grooves on side surfaces is a single elongated structure having a longitudinally uniform cross-sectional shape. The connector has a central wall and is symmetric with respect to the plane of this central wall. Pairs of wings protrude from the central wall to be inserted into the grooves in the frame bars to be connected. The wings of one of the pairs protrude perpendicularly to the central wall. The wings of the other pair are cross-sectionally Z-shaped so as to be able to elastically engage in and with the grooves of the frame bars. Each wing has a mutually outwardly protruding part with a slope for being pressed against edges of the grooves such that the connector can be correctly positioned.

5 Claims, 3 Drawing Sheets

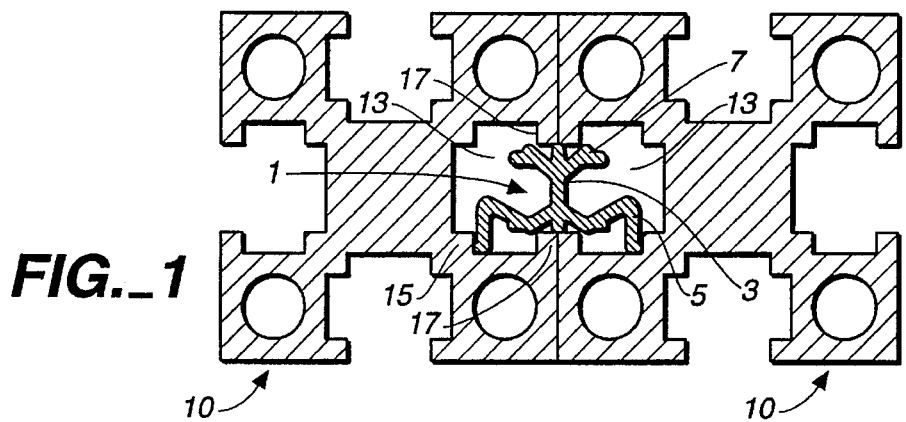
FIG._1
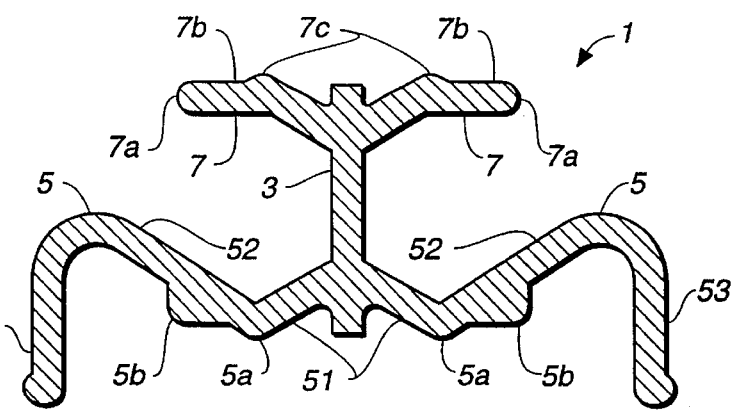
FIG._2
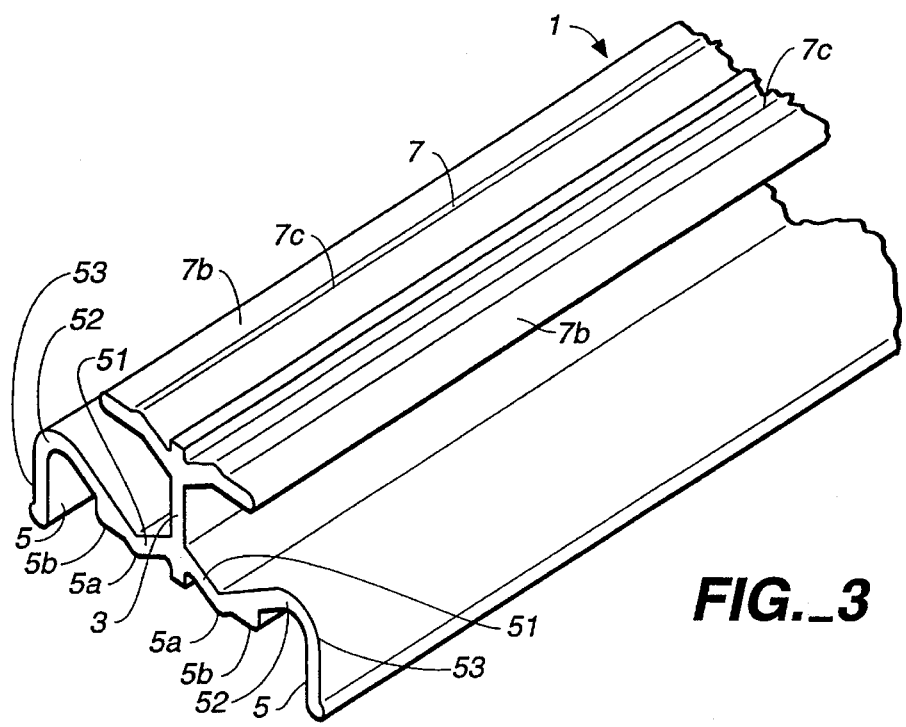
FIG._3

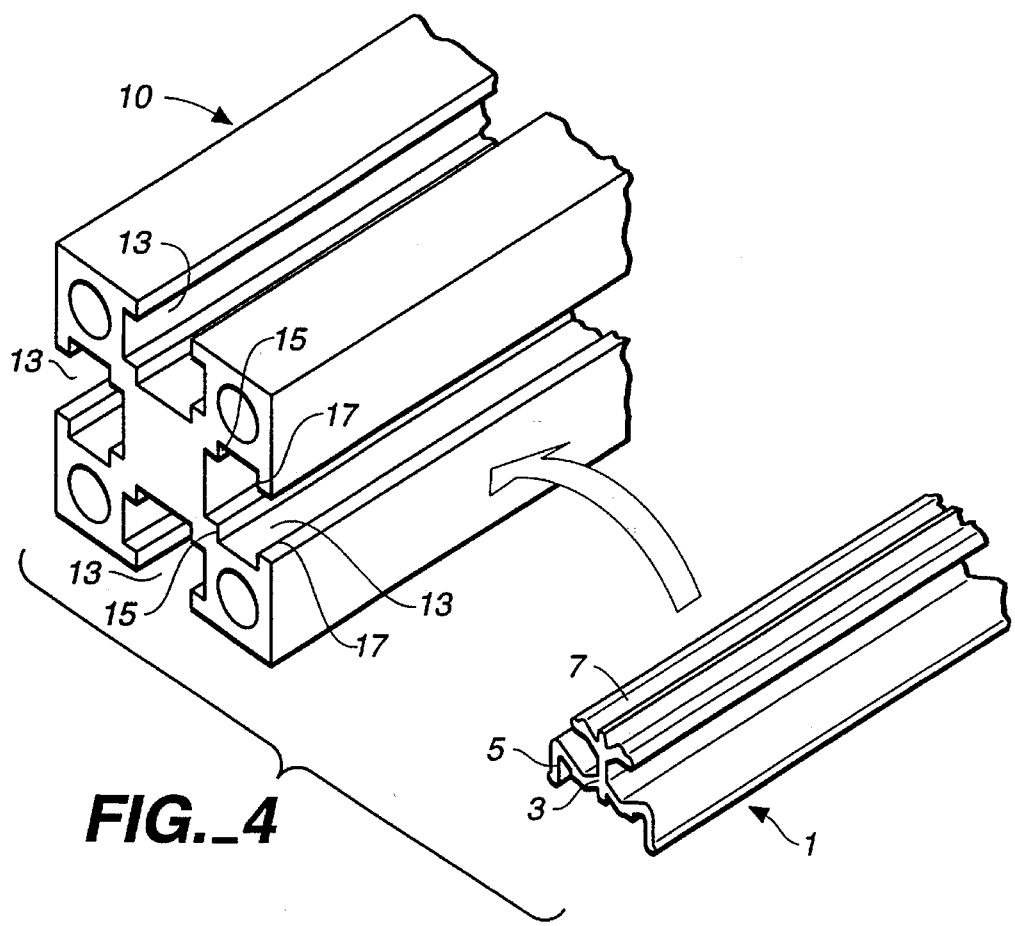
FIG._4
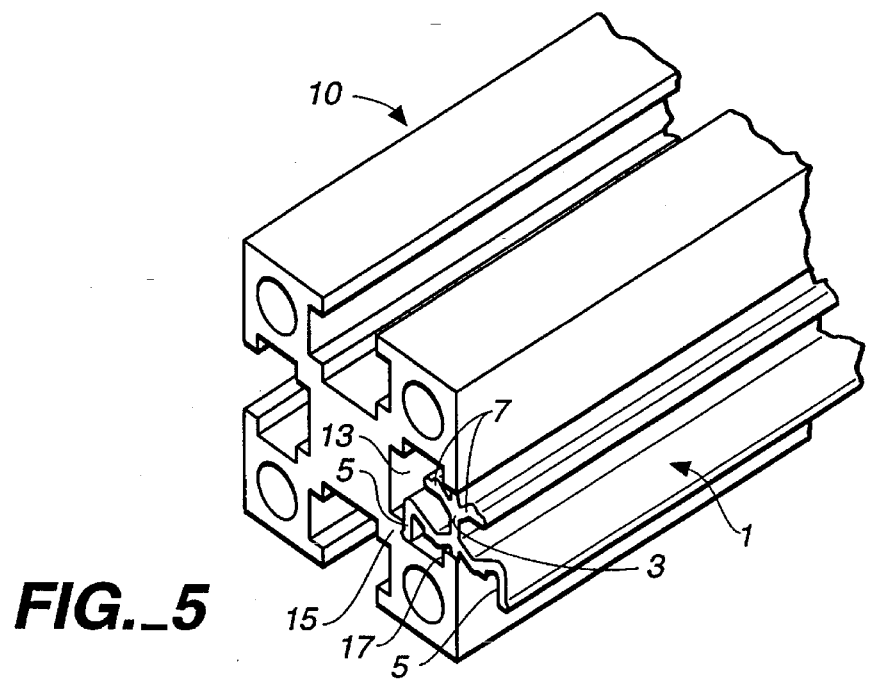
FIG._5

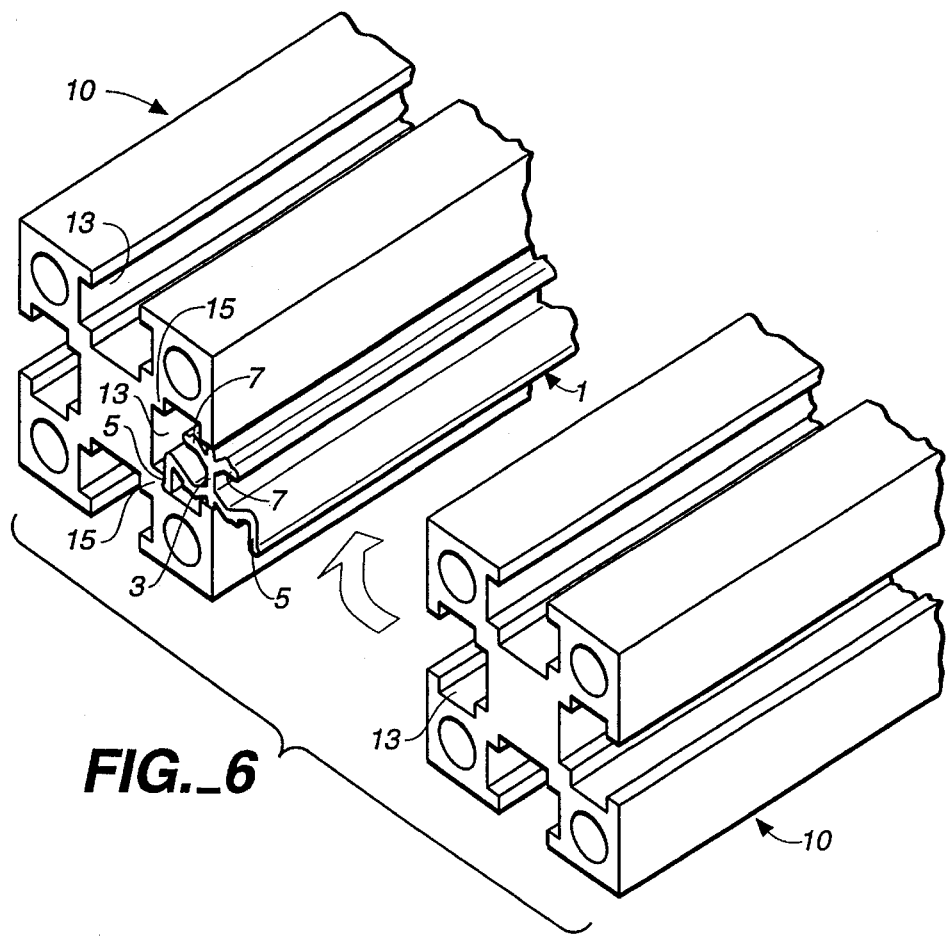
FIG._6
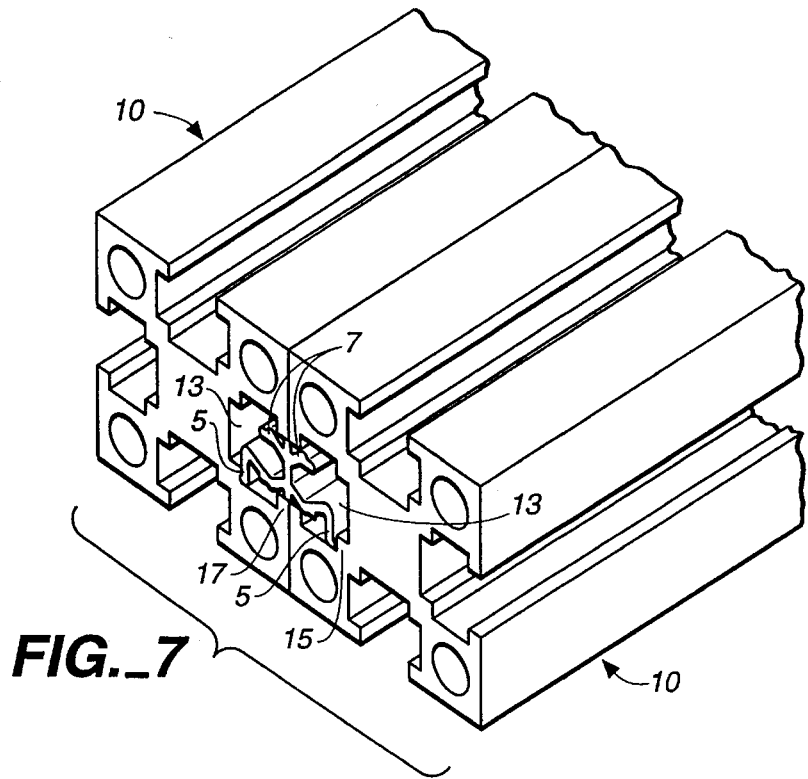
FIG._7

CONNECTORS FOR FRAME BARS WITH T-SHAPED GROOVES

BACKGROUND OF THE INVENTION

This invention relates to devices for connecting together frame bars of the kind having cross-sectionally T-shaped grooves on side surfaces.

Elongated construction materials (herein referred to as frame bars) having cross-sectionally T-shaped longitudinal grooves on side surfaces are known, as sold, for example, by NIC Autotec, Inc. of Toyama, Japan. According to a conventional method of connecting a plurality of such frame bars parallel to and next to one another, the head of a bolt and a nut are inserted into the T-shaped grooves of two frame bars placed adjacent to each other so as not to fall off through the openings of the grooves as they are engaged together. In the case of very long frame bars, holes will have to be drilled additionally in the middle, and a bolt and a nut are similarly used to fasten the middle sections of the frame bars, too. This connecting method is inconvenient because the bolt or the nut must be rotated inside a groove and they must be placed near the end surfaces of the frame bars. In other words, the bolts and nuts cannot always be placed at optimum positions from the point of view of the structural strength. Moreover, a connection by a bolt and a nut is known to be weak against shearing force in a direction of the joined surfaces.

SUMMARY OF THE INVENTION

It is therefore an object of this invention to provide a device (herein referred to as a connector) of a simple structure capable of securely connecting together frame bars of the kind having cross-sectionally T-shaped grooves on side surfaces.

It is another object of this invention to provide such a connector which can connect such frame bars at any longitudinal position therealong.

A connector embodying this invention, with which the above and other objects can be accomplished, may be characterized as being a single elongated structure having a longitudinally uniform cross-sectional shape, which is symmetric with respect to a central wall. Pairs of wings protrude from the central wall to be inserted into the grooves in the frame bars to be connected. The wings of one of the pairs protrude perpendicularly from the central wall. The wings of the other pair are cross-sectionally Z-shaped so as to be able to elastically engage in and with the grooves of the frame bars. Each wing has an outwardly protruding part with a slope for being pressed against an edge part of the groove such that the connector can be correctly positioned. A connector thus structured can be simply pushed into the grooves of the frame bars to be connected together at any longitudinal position therealong and is capable of connecting the frame bars securely without the need to provide the frame bars with throughholes for bolts.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a sectional view of a connector embodying this invention seen longitudinally as connecting together two frame bars having cross-sectionally T-shaped grooves;

FIG. 2 is an enlarged sectional view of the connector of FIG. 1;

FIG. 3 is a diagonal external view of the connector of FIGS. 1 and 2; and

FIGS. 4, 5, 6 and 7 are diagonal external view for showing sequentially a process of using the connector of FIGS. 1, 2 and 3 to connect two frame bars as shown in FIG. 1.

DETAILED DESCRIPTION OF THE INVENTION

As shown in FIG. 1, a connector 1 according to this invention is adapted to engage with the interiors of mutually opposite T-shaped grooves 13 of two frame bars 10 placed parallel to and next to each other to be connected together. As shown in FIGS. 2 and 3, the connector 1 comprises an elongated single structure of an extruded material such as aluminum with a uniform cross-sectional shape which is symmetric with respect to a central wall 3. An elastic pair of cross-sectionally Z-shaped wings 5 protrudes in opposite directions from a lower end of the central wall 3 and another pair of upper wings 7 protrudes similarly in opposite directions from an upper end of the central wall 3, both pairs of the wings extending perpendicularly to the plane of the central wall 3. The expressions "upper" and "lower", as used herein, are to be understood as merely referring to FIGS. 1 and 2 and not as indicating any intended orientation.

As shown in FIG. 2, each of the Z-shaped wings 5 is formed with an inner part 51, a middle part 52 and an end part 53 connected sequentially such that its cross-section is Z-shaped as a whole. The inner part 51 protrudes obliquely from a lower end of the central wall 3, and the middle part 52 is between and connects to both the inner part 51 and the end part 53, extending obliquely to the central wall 3. The end part 5a, which connects the middle part 52 bend therefrom such that it has an externally faced surface which is parallel to the central wall 3. A "bend" of the Z-shape is formed where the inner part 51 and the middle part 52 are joined. The bend provides a downwardly protruding part 5a which protrudes in the direction parallel to the central wall 3 and has a sloped surface for engaging with a part of the T-shaped groove 13. Between the bend and the end part 53, the middle part 52 has a planar surface portion 5b having an outer surface which is perpendicular to the central wall 3.

The pair of upper wings 7 protrudes opposite to each other from the central wall 3, each having an end part 7a distal from the central wall 3 and having a planar part 7b with an upwardly facing surface which is perpendicular to the plane of the central wall 3. Nearer to the central wall 3, the upper wing 7 also has a bend with an upwardly protruding part 7c which symmetrically corresponds to the downwardly protruding part 5a of the Z-shaped wing 5 and has a slope for engaging with a part of the T-shaped groove 13.

Next, a method of using the connector 1 is explained for connecting two of the frame bars 10 described above. First, the connector 1 is cut to the same length as one of the frame bars 10 to be connected, or to any specified length, and one of the Z-shaped wings 5 and one of the upper wings 7 on one side of its central wall 3 are inserted into and engaged with the T-shaped groove 13 of the frame bar 10, as shown in FIGS. 4 and 5. This may be done by first inserting the Z-shaped wing 5 into the groove 13 and pushing it such that the planar parts 5b and 7b of the Z-shaped wing 5 and the upper wing 7 slide against the opening surfaces of the groove 13. For this purpose, the distance between the planar parts 5b and 7b is designed to be approximately equal to the width of the opening of the groove 13 such that the planar parts 5b and 7b can together serve as mutually parallel guides as the connector 1 is pushed into the groove 13. The protruding parts 5a and 7c of the Z-shaped wing 5 and the upper wing 7 thus pass the opening part of the groove 13 to reach edge parts 17 of the opening, stopping at the inner side of the edge parts 17 as the slopes of the protruding parts 5a and 7c engage with the edge parts 17 securely. At the same time, the end part 53 of the Z-shaped wing 5 comes into contact with a step formation 15 on the opposite inner wall of the groove 13 away from the edge parts 17 such that the connector 1 will come to be correctly positioned inside the groove 13 as shown in FIG. 5.

Next, the groove of the other frame bar 1 is similarly matched with the other wings 5 and 7 on the opposite side of the connector 1, as shown in FIGS. 6 and 7. Thus, as shown in FIG. 1, the upper wings 7 engage with the two frame bars 1 on one side and the elastic Z-shaped wings 5 contact the step formations 15 inside the grooves 13 elastically. The protruding parts 5a and 7c of the wings 5 and 7 are elastically pressed against the inner edge parts 17 of the grooves 13 so as to securely set the connector 1 while the Z-shaped wings 5 prevent the connector 1 from further advancing into either of the grooves 13.

With connectors 1 thus structured, frame bars 10 having T-shaped grooves 13 can be easily connected together at any position or positions along their lengths without providing any throughholes to the frame bars. It now goes without saying that two or more short connectors may be used to make a connection or that a connector or connectors according to this invention may be used in combination with the conventional method of connection by means of bolts and nuts although sufficient strength is obtained by connectors according to this invention.

Although the invention has been described above with reference to only one example, this example is not intended to limit the scope of the invention. Cross-sectional shape of the connector may be modified or varied as long as it has elastic parts which are insertable into the T-shaped groove of the frame bars to be connected together and can thus be securely and elastically fastened in the interiors of the grooves.

What is claimed is:

1. A connector for connecting together elongated frame bars having T-shaped grooves on side surfaces, said connector being a single elongated structure having a longitudinally uniform cross-sectional shape, said structure including:

a central wall defining a central plane, said structure being symmetrical with respect to said central plane;

a first pair of wings protruding opposite to each other from said central wall; and a second pair of elastic wings protruding opposite to each other from said central wall, each being cross-sectionally Z-shaped with an inner part, a middle part and an end part, said inner part protruding obliquely from said central wall, said middle part being between said inner part and said end part and extending obliquely to said central wall, said end part extending parallel to said central wall.

2. The connector of claim 1 wherein said first and second pairs of wings have oppositely protruding parts capable of engaging with edges of said grooves.

3. The connector of claim 2 wherein each of said elastic wings has a planar surface part between said end part and said protruding part, said planar surface part being perpendicular to said central plane.

4. The connector of claim 1 wherein said inner part and said middle part connects by forming a bend which protrudes in a direction parallel to said central plane.

5. The connector of claim 4 wherein said middle part has a portion having a planar surface which is perpendicular to said central plane, said portion being between said bend and said end part.

* * * * *